United States Patent [19]

Hines et al.

[11] Patent Number: 4,467,650

[45] Date of Patent: Aug. 28, 1984

[54] HARD STATIC BALANCING MACHINE

[75] Inventors: Gordon E. Hines; Ronald W. Anderson; Arthur W. Henke, all of Ann Arbor, Mich.

[73] Assignee: Hines Industries, Inc., Ann Arbor, Mich.

[21] Appl. No.: 412,166

[22] Filed: Aug. 27, 1982

[51] Int. Cl.³ .............................................. G01M 1/02
[52] U.S. Cl. ................................................. 73/483
[58] Field of Search .......................... 73/483, 484, 485

[56] References Cited

U.S. PATENT DOCUMENTS

| | | | |
|---|---|---|---|
| 2,349,288 | 5/1944 | Lannen | 73/485 |
| 2,898,764 | 8/1959 | Kinsey et al. | 73/483 |
| 2,947,175 | 8/1960 | King et al. | 73/483 |
| 3,091,970 | 6/1963 | Lannen | 73/483 |
| 4,267,730 | 5/1981 | Curchod et al. | 73/462 |

FOREIGN PATENT DOCUMENTS 1340418 12/1973 United Kingdom ................. 73/483

Primary Examiner—James J. Gill
Assistant Examiner—John E. Chapman, Jr.
Attorney, Agent, or Firm—Emch, Schaffer & Schaub Co.

[57] ABSTRACT

A vertical static balancer incorporating novel methods for workpiece support and pivoting, restoring force spring placement, and means for transmission of motion and force therebetween. A single-element flexure pivot provides workpiece support while permitting near frictionless tilting movement around a vertical axis. Restoring force springs, separate from the pivoting function, are interchangeable to readily alter machine capacity. A rigid tubular member transmits unbalance effects from the workpiece to springs and displacement transducers attached thereto. Simplified electrical circuitry enables data to be transmitted from panel controls to a digital computer by means of a single conductor.

7 Claims, 5 Drawing Figures

HARD STATIC BALANCING MACHINE

FIELD OF INVENTION

A static balancer is a machine designed to determine state of balance of a rotating element, hereafter "workpiece", without the necessity of actually spinning the workpiece. Static balancing eliminates the time required to rotationally accelerate the workpiece and brake it to a stop. There is usually less mechanical complexity associated with a static balancer. Workpiece centering and fixturing is also simplified as there is no torque due to angular acceleration. Static balancing is thus particularly well suited to high workpiece volume applications where extreme precision balance is not required. Consequently, a variety of designs have evolved over the years devoted to addressing certain problems in common.

Static balancers may be classified as two basic types; horizontal axis, and vertical axis. In the first type, the workpiece axis is oriented horizontally in the balancer with the workpiece freely rotatable allowing the "heavy spot" to roll down.

The latter type supports the workpiece axis vertically wherein unbalance causes angular displacement between the balancer vertical axis and the workpiece mass axis. In other words, the workpiece tilts from the plane it would otherwise occupy if balanced. The magnitude and direction of tilt about the vertical machine axis are measured by the balancer instrumentation. Some form of readout indicates to the machine operator the amount and location of workpiece unbalance.

Since a static balancer utilizes the effect of gravity, it can in principle measure only "force" unbalance as opposed to "couple" unbalance which requires dynamic or spin balancing to detect. Therefore workpiece geometry must be such that most of the mass is concentrated in a single plane to avoid the presence of couple unbalance. Typical workpiece configuration appropriate for static balancing is a large diameter relative to axial length, generally of a disc-shaped character.

A static balancer must have some form of pivot about which the center of mass of the workpieces acts under the influence of gravity. The nature of the pivot in paramount to the performance of the balancer. Usually the pivot consists of a rounded point such as a steel ball, interposed between the tilting member and a stationary support. Machine ruggedness dictates a point of large radius while sensitivity calls for a small radius. A compromise must be found but ultimately the system is limited in sensitivity to the inherent rolling resistance of the mating elements. Other means have been employed in pivot design wherein a film of air or oil is maintained between a close-fitting ball and socket to achieve high sensitivity while retaining ruggedness. Drawbacks to this approach are the necessity of auxiliary pumps, filter, air dryers and associated control equipment, as well as susceptibility to contaminants in an industrial environment.

A static balancer is equipped with a fixture to locate the balanced workpiece mass-center directly above the pivot. By definition a balanced workpiece has a mass-center coincident with the geometric center. Therefore the fixture must only locate the geometric center over the pivot. If unbalance exists, the mass and geometric center will be displaced. The offset mass-center will cause the workpiece and fixture assembly to tilt to a degree limited only by a restoring force built into the static balancer. A restoring force that permits a large tilt relative to the amount of unbalance is known as a "soft" system. Historically static balancers have been of the soft type since large tilt deflections are easily measured by the balancer instrumentation. A serious disadvantage to the soft suspension arises from the shift of mass-center away from the pivot center as a function of tilt alone. Thus workpieces of different weights will produce different degrees of tilt for a given unbalance. A soft static balancer is sensitive to workpiece weight and corresponding corrections either to restoring force magnitude or deflection measurement calibration must be made whenever a workpiece of different weight is to be balanced.

A large restoring force permitting only minute deflection due to unbalance is termed "hard" suspension. The advent in recent years of ultra sensitive and accurate electronic displacement measuring techniques has made the hard suspension feasible, largely overcoming the difficulty of weight sensitivity in soft machines.

The type of restoring force most predominant in static balancers is supplied by counterweights. The mass-center of the counterweight resists displacement from a position directly beneath the pivot. While counterweights have seen wide spread use in soft type balancers, the large, unwieldly weight required for a hard suspension make application thereto impractical. Restoring force for hard type balancers, therefore, has generally been supplied by springs, the stiffness of which is largely independent of weight. Where the single element fixture pivot has been used in prior art the flexure has been made sufficiently stiff to provide "hard" restoring force. Such a combination of pivot and spring in one element creates problems in poor temperature stability and in-field spring replacement to alter machine weight capacity.

Hard suspension machine performance has also been achieved by use of force transducers or load cells capable of directly reading unbalance moment with negligible deflection. The sensitivity and repeatability required by a balancing machine, from load cells, has proven unsatisfactory. Prior art indicates hard machine capability obtained from a "counter-force" system in which unbalance deflection is nulled by applying a counter-force equal and opposite to the unbalance force tending to cause deflection. Measurement of the applied counterforce yields information as to the amount and location of unbalance.

All spring-mass systems possess resonant vibration properties. If it were not for internal molecular friction, such vibration, once begun would continue indefinitely. The steel members comprising a balancing machine are highly elastic permitting oscillation of suspended elements for unacceptable lengths of time. As a result, balancing machines are equipped with damping means to absorb vibration energy as friction loss. Most common damping employs viscous fluid between stationary and suspended elements. The viscous drag, or friction, of a fluid is proportional to the shear velocity gradient, becoming "frictionless" as the velocity approaches zero, as required in a balancing machine measuring minute forces.

SUMMARY OF THE INVENTION

The present invention embodies novel features to the pivot means and restoring force means.

Elasticity is defined in terms of energy loss in deflecting a spring through a cycle from an initial position and back again. In a highly elastic system nearly all the energy of deflection stored in the spring is recoverable upon completion of the cycle. With inelastic deformation as found in lead or putty, the energy path is irreversible (high hysteresis), energy loss appearing as heat from internal molecular friction. Spring steel with its high elasticity and consequent low energy loss can be used to form a nearly ideal pivot, having no apparent friction.

One object of the invention is to provide a pivot in a vertical static balancer consisting of a spring steel rod. The axial length of the rod is substantially greater than its diameter and the axis thereof is oriented vertically. The upper portion of the rod, hereafter "flexure" is affixed to the workpiece fixture while the lower portion attaches to a stationary support member.

Intrinsic in the described configuration of the flexure is axial rigidity and radial resilience in the bending mode. Full weight of the workpiece and fixture is assumed by the flexure while simultaneously permitting nearly frictionless tilting thereof. Slight restoring force produced by the flexure does not constitute friction, as explained earlier, but in fact, augments the existing restoring force necessary in all vertical static balancers.

While a stiff flexure pivot could have been used to supply the total restoring force, it has been found advantageous to separate this restoring function from the pivoting function. Therefore another object of this invention is separate restoring force springs incorporated to render, in the preferred embodiment, hard suspension operation of the balancer. Separate springs facilitate easy removal and replacement with springs of various stiffness. In this manner the weight capacity of a given machine is convertible to accommodate a broad range of workpiece weights. Furthermore, experience has shown that separating the springs from the flexure pivot makes the balancer less prone to "drift" due to ambient temperature fluctuations.

Angular tilt of the workpiece due to unbalance is translated to a more linear motion for displacement measuring purposes by a cylindrical tube. The tube circumferentially surrounds the stationary flexure support member and serves also to transmit restoring force from the springs to the workpiece. Certain configurations found in prior art achieve this transfer of motion and force by rods subject to resonant vibration and temperature distortion. Another object of this invention therefore is provision of a tube, as described above, fixed at the upper end to the workpiece fixture and connected at the lower end to displacement transducers and restoring force springs via suitable linkage arrangements.

In a computer based balancing machine, it is necessary to input several parameters to the computer for the purpose of establishing the operating mode, desired part correction radius, number of segments (fan blades, etc.). A simple means to allow the input of such parameters is to use a potentiometer connected between the Analog to Digital converter reference voltage and ground. The voltage read by the Analog to Digital converter may be appropriately scaled by the computer and displayed on the panel display. For example, an Analog to Digital converter may have a conversion range such that for 0 to 5 volts input, the output is an integer number from 0 to 255. If it is desired to allow input of a correction radius of 0 to 10 inches, for example, the computer may multiply the converter output value by approximately 0.04 to obtain values between 0.0 and 10.0. Another use of the A/D converter is to read the position of multi-position switches. If, for example, a 6 position switch is to be used to select the operating mode, five equal resistors are connected between successive poles of the switch. The counterclockwise pole is then connected to ground, and the clockwise one to the reference voltage. The integer output of the A/D converter is then multiplied by the number of poles minus 1, and divided by the full scale value. E.g. for a 6 position switch, the output is multiplied by 5/255. The resulting value is rounded to the nearest integer value (not truncated), and the resulting number in the range of 0 to 5 corresponds to the switch position.

These techniques result in minimum interconnecting wiring between the front panel of the electronics and the computer. One wire is required for each potentiometer and switch, plus two wires (ground and reference voltage) that are common to all front panel controls. Resistors with a tolerance of 5% will be adequate for switches up to about 8 poles.

This technique is particularly useful since A/D converters are available with multiplexed inputs (up to 16 or more) that are switch selectable by computer control. The computer may then by simple software "read" all of the controls on the front panel.

Another object of this invention, then, is provision of simplified circuitry of the electronic digital computing means associated with the balancing machine.

It will be noted that an advantage of using a selector switch or potentiometer to input data, as opposed to the more conventional keyboard method, is their inherent memory capability. In the event of power failure, the input data is retained in the mechanical position of these controls.

A further object of this invention is the electronic display of data input to the machine operator rather than depending on mechanical panel scales and graduations which require careful calibration for matching actual input to indicated input and are subject to drift over a period of time.

DESCRIPTION OF PREFERRED EMBODIMENTS

Shown in FIG. 1 is a perspective view of a complete vertical static balancing machine.

A side view of the balancer is shown in FIG. 2 with a partial cutaway of enclosure 1 revealing internal components.

Figure 5:
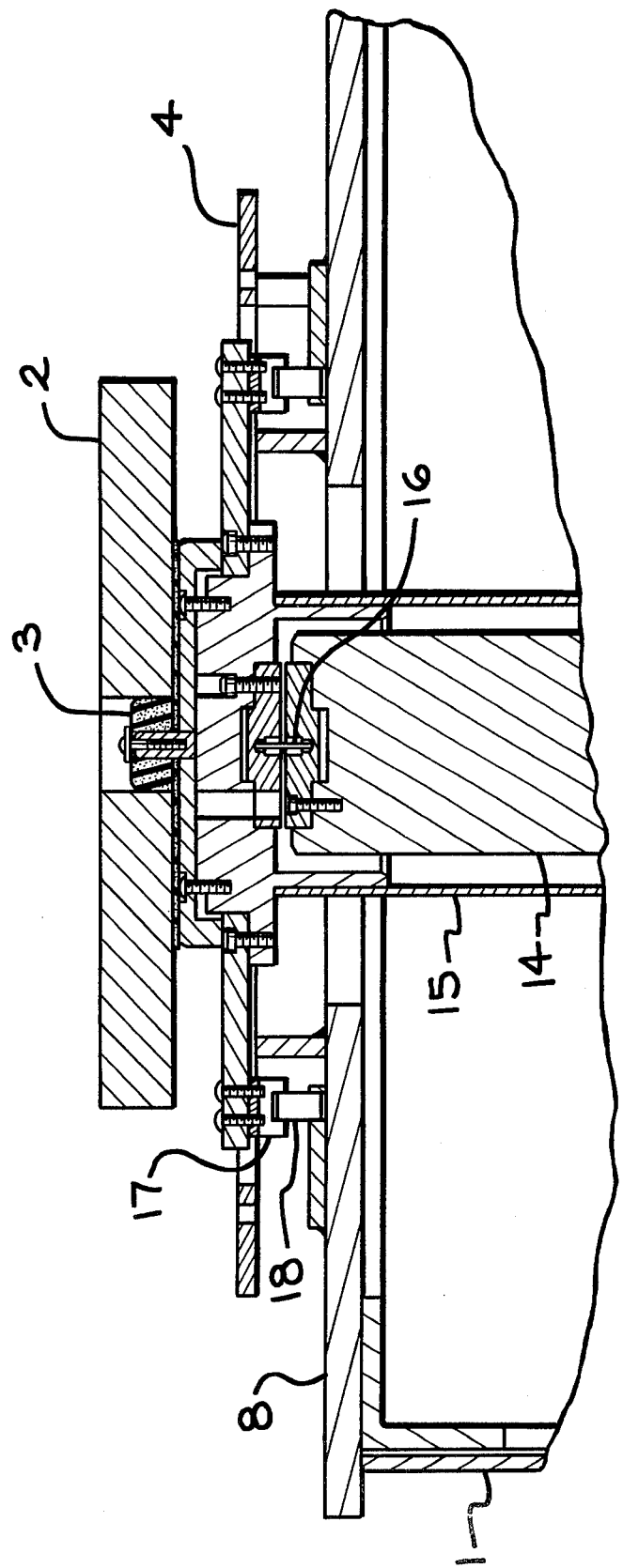

A cross-sectional of the pivot and associated mechanism is shown in FIG. 5.

A static balancing machine, according to the present invention has a means for supporting a workpiece on a vertical axis. A single-element pivot flexure has a longitudinal axis oriented vertically. The pivot flexure is interposed between the workpiece fixture and a stationary member in order to rigidly support said workpiece weight under compression, while providing resilience for transverse bending due to said workpiece unbalance moment, without contributing substantially to the restoring force of said balancing system.

The pivot consisting of spring steel and having a general rod configuration is attached at the top thereof to the workpiece fixture and at the bottom thereof to a stationary supporting member. The pivot functions separate and independent of a restoring force means.

The restoring force means is separate from the pivoting means, wherein a restoring force is developed independent of said pivoting means. The restoring force means consists of spring steel of substantially elongated round or flat configuration, secured to a stationary member at one end thereof and secured to workpiece fixture at the other end thereof. The securing means at the stationary member is non-permanent to facilitate interchange of the springs.

The static balancing machine, according to the present invention includes means for an intermediate member so disposed as to transmit unbalance force and/or movement from the workpiece fixture to the restoring force means and to displacement or force measuring means. In one embodiment the intermediate member comprises a tubular member circumferentially surrounding the stationary pivot support member. The tubular member is attached at the top thereof to the workpiece fixture and at the bottom thereof to the restoring force means and the displacement measuring means.

The balancing machine has an electronic displacement measuring and analyzing means incorporating a microprocessor or other digital computing means. Multiple data is inputted to the computing means via a single conductor from a front panel control by converting the data to analog form by the control and from analog to digital form for utilization by the computing means. A selector switch or potentiometer subdivides a reference voltage into proportional analog voltages corresponding to data input. The analog voltages are transmitted from the switch or potentiometer via a single wire from the control panel to electronic circuitry, wherein the analog voltage is converted to digital form for inputting the data to a microprocessor or other digital computing means. A control panel mounted selector switch or potentiometer provides means for data input to a digital computing means. The data is displayed electronically indicating to the machine operator the actual information processed by said computing means independent of the control panel scales attendant to the selector switch or potentiometer.

Operation of the balancer is better understood by reducing the machine to three basic areas:

I. The workpiece pivot. Referring to FIG. 5, workpiece 2 is geometrically centered by fixture 3. Fixture 3 is attached to upper portion of pivot rod 16 and is supported entirely thereby. Lower portion of rod 16 is secured to stationary support 14. Due to the torsional and bending resilience of rod 16, travel stops 17 and 18 limit both twisting and tilting motion of fixture 3 during loading and unloading of workpiece 2, thereby preventing overstressing of rod 16. During the actual measurement of unbalance no portion of fixture 3 is in physical contact anywhere with stationary parts of the machine other than rod 16 and restoring force means described next.

Figure 2:
Figure 2:
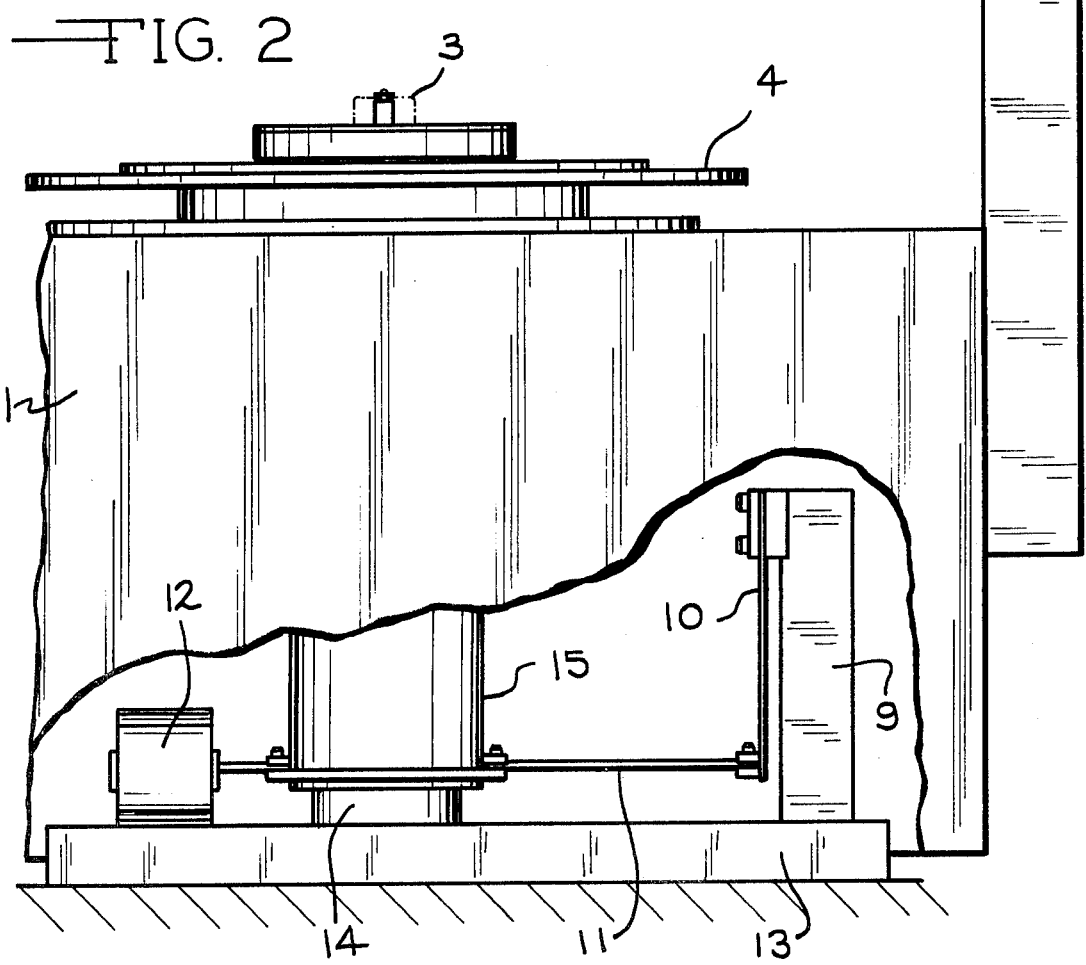

II. The restoring force means. Movement of fixture 3 about pivot rod 16 is transmitted by tube 15 shown attached at upper end thereof to fixture 3 in FIG. 5. The lower end of tube 15 is shown in FIG. 2 attached to restoring force flat spring 10 via linkage 11. Spring 10 is anchored at its upper end to stanchion 9 which in turn is rigidly affixed to machine base 13. Also shown in FIG. 2 is stationary support 14 attached to base 13.

Figure 3:
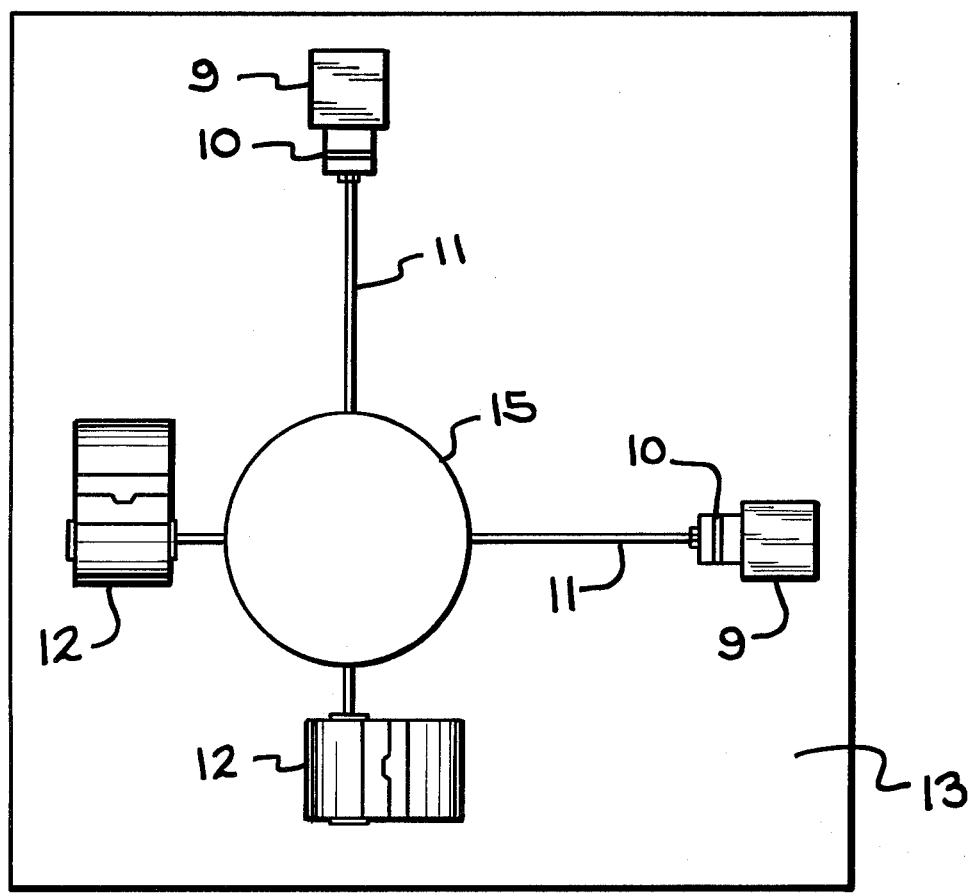
FIG. 3 is a top plan view of the same components shown in FIG. 2.

A top view of this same mechanism in FIG. 3 shows how tilting motion of the fixture due to unbalance is reduced to orthogonal components by placement of two restoring force springs 10 oriented at right angles with respect to one another.

Figure 4:
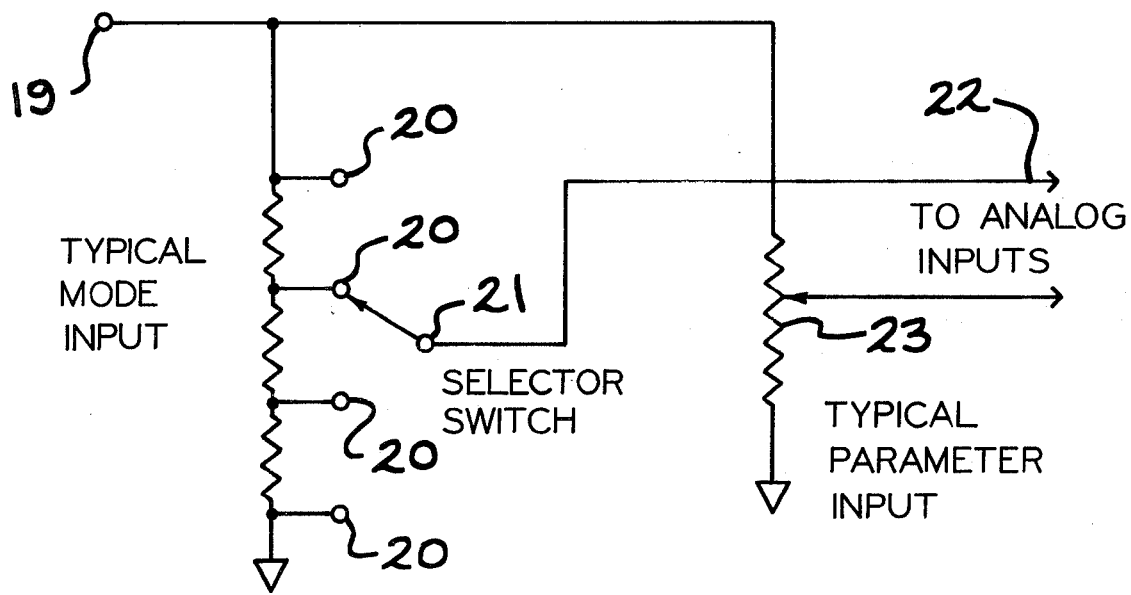
FIG. 4 is an electrical schematic of the circuits for entering input data to the microprocessor.

III. Displacement measuring means. FIG. 2 shows tube 15 also connected to displacement transducer 12 which is of the Linear Variable Displacement Transformer (L.V.D.T.) type wherein there is no physical contact between stationary and moving elements. FIG. 3 again shows two transducers 12 required to read orthogonal components of tube 15 deflection. Electronic unit 5 combines signals from both transducers 12 to produce a vector resultant corresponding to the actual location of unbalance as well as the magnitude thereof. Unbalance information is displayed to the machine operator on readout 7 while operating mode and workpiece dimensional data is entered by selector switches 6 shown in FIG. 1. FIG. 4 shows a typical selector switch 6 with four position contacts 20 connected therebetween by equal value resistors as a voltage divider network. Incremental voltages, proportional to reference voltage 19 are picked off by switch 6 wiper 21. For an infinitely variable range input switch 6 may also consist of a potentiometer 23. With either method, a single wire 22 suffices to communicate multiple inputs to a microprocessor via an Analog to Digital converter. Input information entered by controls 6 is displayed to machine operator on display 7 rather than on scales printed on face panel of electronic unit 5.

Figure 1:
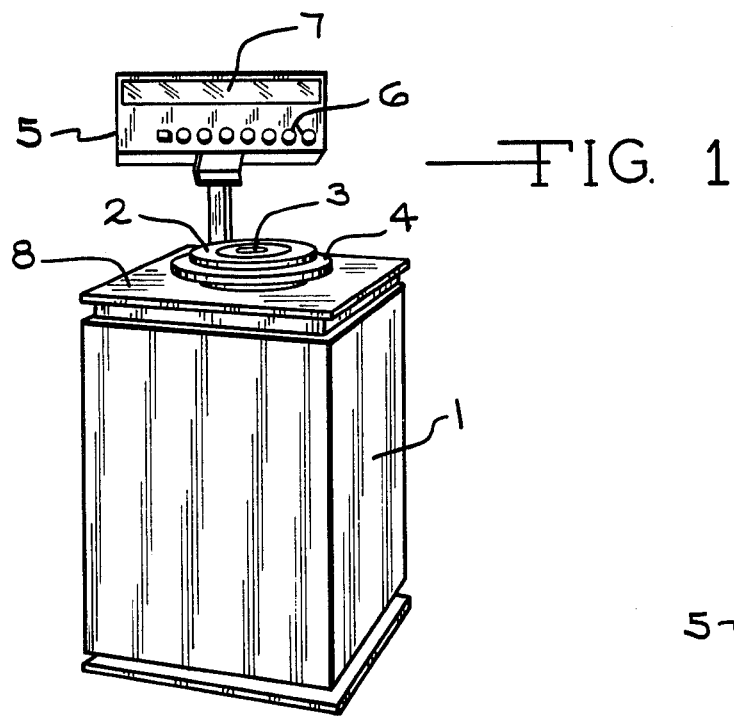

A practical embodiment of the present invention will include machine enclosure 1 and top plate 8 shown in FIG. 1 to seal out industrial contaminants. Angle ring 4 mounted to top plate 8 is marked with angular graduations to facilitate visual location of workpiece unbalance as indicated by electronic readout 7.

The preferred embodiment, as described above, is intended to be exemplary in nature and by no means limits the scope of modifications possible and apparent to those skilled in the art without materially departing from the intent and spirit of this invention.

We claim:

1. A hard suspension static balancing machine comprising, in combination, a stationary support member having an upper end and a lower end, said stationary support member defining a vertical axis, a vertical pivot rod mounted on such vertical axis adjacent said upper end of said stationary support member, a workpiece support fixture mounted on said vertical pivot rod, a rigid transmitting member attached to said workpiece support fixture and extending downwardly from said fixture, restoring spring means, independent of said vertical pivot rod and connected to said rigid transmitting member for restoring said workpiece support fixture, a control panel and measuring means adjacent said transmitting member for measuring workpiece displacement and communicating such displacement to such control panel.

2. A hard suspension static balancing machine according to claim 1, wherein said pivot rod comprises a spring steel rod, said spring steel pivot rod functioning independently of said restoring spring means.

3. A hard suspension static balancing machine according to claim 1, including travel stop means adjacent said workpiece support fixture for limiting twisting and tilting motions of said workpiece support fixture.

4. A hard suspension static balancing machine according to claim 1, wherein said rigid transmitting member comprises a rigid tube attached to said workpiece support fixture, said tube being in a surrounding and spaced relationship with said stationary support member.

5. A hard suspension static balancing machine according to claim 1, wherein said restoring spring means includes at least two stanchions spaced from said rigid transmitting member, a restoring spring removably mounted on each of said stanchions and linkage means extending between said rigid transmitting member and said restoring spring.

6. A hard suspension static balancing machine according to claim 1, wherein said measuring means includes two transducers mounted 90° from one another, relative to such vertical axis.

7. A hard suspension static balancing machine comprising, in combination, a stationary support member having an upper end and a lower end, said stationary support member defining a vertical axis, a vertical pivot rod mounted on such vertical axis adjacent said upper end of said stationary support member, a workpiece support fixture mounted on said vertical pivot rod, a rigid tube attached to said workpiece support fixture, said tube circumferentially surrounding the workpiece support fixture, restoring spring means, independent of said vertical pivot rod and connected to said tube, for restoring said workpiece support fixture, said restoring spring means comprising at least two stanchions adjacent said tube, a spring removably mounted on each of said stanchions and operatively connected to said tube, and measuring means adjacent said tube for measuring workpiece displacement, said measuring means including two transducers mounted 90° from one another, relative to such vertical axis.

* * * * *